(12) United States Patent
Ogden et al.

(10) Patent No.: US 10,690,828 B2
(45) Date of Patent: Jun. 23, 2020

(54) ADHESIVE-FREE POLARIZER

(71) Applicant: Moxtek, Inc., Orem, UT (US)

(72) Inventors: Shaun Ogden, Saratoga Springs, UT (US); Liang Gao, American Fork, UT (US); David Vern Nelson, Orem, UT (US)

(73) Assignee: Moxtek, Inc., Orem, UT (US)

( * ) Notice: Subject to any disclaimer, the term of this patent is extended or adjusted under 35 U.S.C. 154(b) by 207 days.

(21) Appl. No.: 16/028,786

(22) Filed: Jul. 6, 2018

(65) Prior Publication Data

US 2019/0064415 A1 Feb. 28, 2019

Related U.S. Application Data (60) Provisional application No. 62/552,076, filed on Aug. 30, 2017.

(51) Int. Cl.
*G02B 5/30* (2006.01)
*C23C 28/00* (2006.01)

(52) U.S. Cl.
CPC ............ *G02B 5/3058* (2013.01); *C23C 28/00* (2013.01)

(58) Field of Classification Search
None
See application file for complete search history.

(56) References Cited

U.S. PATENT DOCUMENTS

| | | | |
|---|---|---|---|
| 6,284,085 B1 | 9/2001 | Gwo | |
| 6,548,176 B1 | 4/2003 | Gwo | |
| 7,961,393 B2 | 6/2011 | Perkins et al. | |
| 8,755,113 B2 | 6/2014 | Gardner et al. | |
| 9,726,897 B2 | 8/2017 | Huang et al. | |
| 2007/0297052 A1* | 12/2007 | Wang | G02B 5/1809 359/487.03 |
| 2009/0294051 A1* | 12/2009 | Traggis | C03C 27/06 156/275.5 |
| 2010/0302481 A1 | 12/2010 | Baum et al. | |
| 2012/0008205 A1 | 1/2012 | Perkins et al. | |
| 2014/0354910 A1 | 12/2014 | Park et al. | |
| 2015/0346497 A1 | 12/2015 | Huang et al. | |
| 2017/0322425 A1 | 11/2017 | Wang et al. | |

OTHER PUBLICATIONS

International Search Report dated Nov. 5, 2018, in International Application No. PCT/US2018/0471272, filed Jul. 9, 2018; 4 pages.

\* cited by examiner

*Primary Examiner* — Jeffry H Aftergut
(74) *Attorney, Agent, or Firm* — Thorpe, North & Western, LLP (57) ABSTRACT

A cube wire grid polarizer or an embedded wire grid polarizer can include an adhesive-free, direct bond between the wire grid polarizer and piece(s) of glass. Consequently, index of refraction mismatch can be avoided and the polarizer can have improved high temperature tolerance. The polarizer can include multiple layers over the wire grid polarizer, with the top of these layers polished, then directly bonded to the piece of glass. Material of the top layer can be selected such that thickness of this layer is not critical, thus allowing polishing.

20 Claims, 6 Drawing Sheets

ADHESIVE-FREE POLARIZER

CLAIM OF PRIORITY

This application claims priority to U.S. Provisional Patent Application No. 62/552,076, filed on Aug. 30, 2017, which is incorporated herein by reference.

FIELD OF THE INVENTION

The present application is related generally to wire grid polarizers.

BACKGROUND

Glue can adhere a wire grid polarizer to a sheet of glass. Disadvantages of using the glue/adhesive include difficulty of matching an index of refraction of the glue to the glass; damage to the glue by high temperature; and small bubbles in the glue can distort transmitted light.

SUMMARY

It has been recognized that it would be adhere a wire grid polarizer to glass without glue/adhesive. The present invention is directed to methods of adhering polarizers to glass that satisfy this need.

The method can comprise providing a wire grid polarizer with an array of wires on a substrate and a thin film over the array of wires, the thin film having a solid first surface farther from the array of wires, and directly bonding the solid first surface of the thin film to a solid surface of a first piece of glass. In another embodiment, the method can include polishing the solid first surface of the thin film prior to directly bonding to the first piece of glass. In another embodiment, the method can comprise applying the thin film, including applying a lower layer over a distal end of the array of wires and applying an upper layer over the lower layer. In another embodiment, the method can include applying a middle layer between the lower layer and the upper layer, the middle layer having an index of refraction greater than an index of refraction of the lower layer and greater than an index of refraction of the upper layer.

BRIEF DESCRIPTION OF THE DRAWINGS (DRAWINGS MIGHT NOT BE DRAWN TO SCALE)

DEFINITIONS

As used herein, the terms "adjoin", "adjoins", and "adjoining" mean direct and immediate contact between the materials adjoined.

As used herein, the term "cube" means an approximately cube-shaped optical device, usually with about six sides. Opposite sides are not necessarily parallel, and the sides do not have to have the same area with respect to each other, unless explicitly specified otherwise. Examples of cubes are shown in USA Patent Publication Numbers US 2015/0346497 and US 2017/0322425, which are incorporated herein by reference.

As used herein, the terms "directly bonded", "directly bonding", and "direct bond" mean a bond between two items without any additional intermediate layer(s). For example, a direct bond between two items is a direct chemical bond between the two items without an adhesive. Direct bonding methods are described in U.S. Pat. Nos. 6,548,176 and 6,284,085, which are incorporated herein by reference.

As used herein, the term "elongated" means that a length of the wires 14 (length extending into each sheet of the figures) is substantially greater than wire width or wire thickness.

As used herein, the terms "fill the channels" and "filling the channels" mean that the channels 18 are filled completely, filled as completely as allowed by normal manufacturing methods, or filled nearly complete such that any deviation from filled completely would have negligible effect for ordinary use of the polarizing cube.

As used herein, the term "mm" means millimeter(s) and the term "nm" means nanometer(s).

As used herein, the term "on" means located directly on, or located above with some other solid material between.

As used herein, the term "parallel" means exactly parallel, parallel within normal manufacturing tolerances, or nearly parallel, such that any deviation from exactly parallel would have negligible effect for ordinary use of the device.

As used herein, the term "substrate" means a base material, such as for example a glass wafer. Unless specified otherwise in the claims, the term "substrate" also includes any thin film(s) sandwiched between the glass wafer and the wires of the polarizer. The substrate can be thick in an optical sense, meaning substantially thicker than a maximum wavelength of light in the wavelength range of use, if explicitly so stated in the claims. For example, a thickness $Th_{13}$ of the substrate can be 0.1 mm, ≥0.35 mm, or ≥0.6 mm.

Each index of refraction value referred to herein means an average value of such index of refraction across a wavelength range from 400-700 nm.

DETAILED DESCRIPTION

Figure 1:
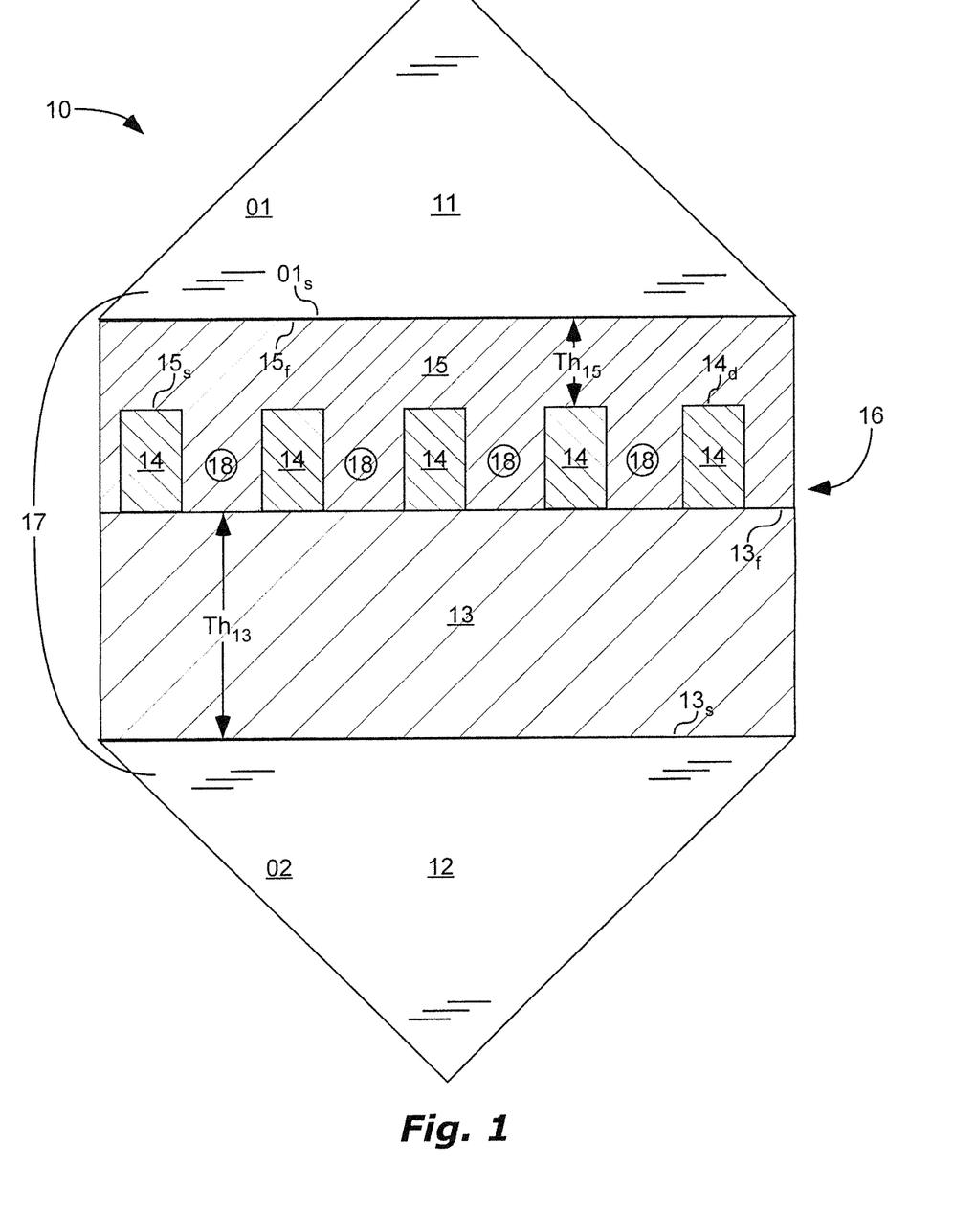
FIG. 1 is an end-view of a wire grid polarizing cube 10 comprising a wire grid polarizer 16 sandwiched between a pair of prisms 17, a thin film 15 of the wire grid polarizer 16 adjoining a first prism 11 of the pair of prisms 17, in accordance with an embodiment of the present invention.
Figure 2:
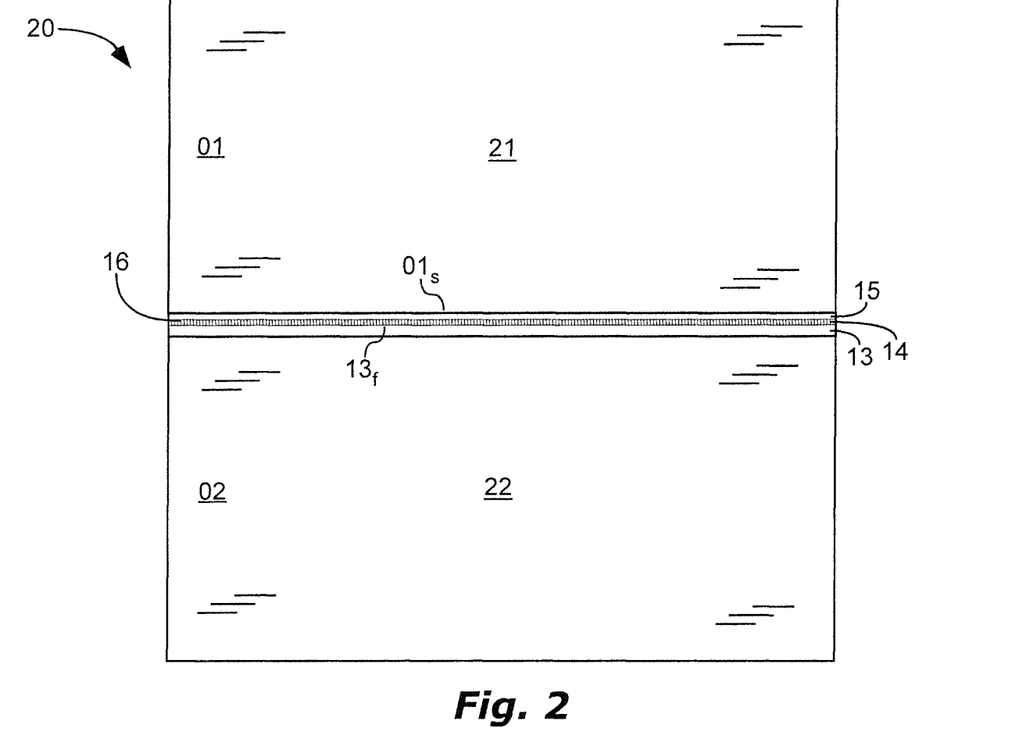
FIG. 2 is an end-view of an embedded wire grid polarizer 20 comprising a wire grid polarizer 16 sandwiched between a first sheet of glass 21 and a second sheet of glass 22 with a thin film 15 of the wire grid polarizer 16 adjoining the first sheet of glass 21, in accordance with an embodiment of the present invention.

As illustrated in FIGS. 1-2, a wire grid polarizing cube 10 and an embedded wire grid polarizer 20 are shown comprising a wire grid polarizer 16 sandwiched between a first piece of glass 01 and a second piece of glass 02. In the wire grid polarizing cube 10 of FIG. 1, the first piece of glass 01 and the second piece of glass 02 are a pair of prisms 17, including a first prism 11 and a second prism 12, and the wire grid polarizer 16 is enlarged to more clearly show wire grid polarizer 16 components. In FIG. 2, the first piece of glass 01 is a first sheet of glass 21 and the second piece of glass 02 is a second sheet of glass 22.

In FIGS. 1-2, the wire grid polarizer 16 can include a substrate 13 having a first face $13_f$ and a second face $13_s$ opposite of the first face $13_f$; an array of wires 14 on the first face $13_f$ of the substrate 13 with channels 18 between adjacent wires 14; and a thin film 15 extending over a distal end $14_d$ of the array of wires 14 farther from the substrate 13. The thin film 15 can fill the channels 18. The wires 14 can be elongated and parallel.

The array of wires 14 and the thin film 15 can be made of or can include materials for polarization of light, including metals and dielectrics, as are typically used in wire grid polarizers. See for example U.S. Pat. Nos. 7,961,393 and 8,755,113, which are incorporated herein by reference.

The thin film 15 can have a solid first surface $15_f$ farther from the array of wires 14 and a solid second surface $15_s$ facing the array of wires 14 and the first face $13_f$ of the substrate 13. The solid first surface $15_f$ of the thin film 15 can adjoin the first piece of glass 01. The second face $13_s$ of the substrate 13 can adjoin the second piece of glass 02.

The thin film 15 can be directly bonded to the first piece of glass 01. The substrate 13 can be directly bonded to the second piece of glass 02. A method of direct bonding is described below. An advantage of direct bonding instead of using an adhesive is a smaller distance between the distal end $14_d$ of the array of wires 14 and the first piece of glass 01. An adhesive can be multiple micrometers thick, but a direct bond can have zero thickness as the thin film 15 directly adjoins the first piece of glass 01. Therefore, any distance between the distal end $14_d$ of the array of wires 14 and the first piece of glass 01 can be due to the thin film 15 only. For example, a thickness $Th_{15}$ of the thin film 15 between the distal end $14_d$ of the array of wires 14 and the first piece of glass 01, and a distance between the distal end $14_d$ of the array of wires 14 and the first piece of glass 01, can be equal to each other and can be ≤2000 nm, ≤1000 nm, ≤500 nm, ≤300 nm, or ≤150 nm; and ≥0.01 nm, ≥0.1 nm, ≥1 nm, ≥10 nm, or ≥30 nm. This distance between the distal end $14_d$ of the array of wires 14 and the first piece of glass 01 can be filled solely by the thin film 15.

Embodiments of the wire grid polarizing cube 10, the embedded wire grid polarizer 20, and the thin film 15 can be entirely, ≥90%, ≥95%, ≥99%, or ≥99.8% inorganic. The solid first surface $15_f$ of the thin film 15 can be inorganic. In contrast, an adhesive, binding a wire grid polarizer to prism(s), can be organic, which can be damaged by higher temperatures. Such damage can resit in degradation of polarizer performance. In contrast, by making the wire grid polarizing cube 10 or the embedded wire grid polarizer 20 without an adhesive, each can withstand higher temperature. Thus for example, embodiments of the wire grid polarizing cube 10, the embedded wire grid polarizer 20, or both can withstand a temperature of ≥300° C. for 10 hours with ≤1% reduction in transmission of a primarily transmitted polarization (e.g. Tp) and ≤0.1% increase in transmission of an opposite polarization (e.g. Ts).

It can be difficult to match an index of refraction of an adhesive to an index of refraction of the prism and to an index of refraction of a thin film covering wires of a wire grid polarizer. Adhesion-free bonding resolves this problem. A material of an upper layer 33 of the thin film 15 can be the same as or similar to a material of the first piece of glass 01. Consequently, a difference between an index of refraction of the solid first surface $15_f$ of the thin film 15 and an index of refraction of the first piece of glass 01 can be ≥0.1, ≤0.05, ≤0.02, ≤0.01, or ≤0.002.

Figure 6:
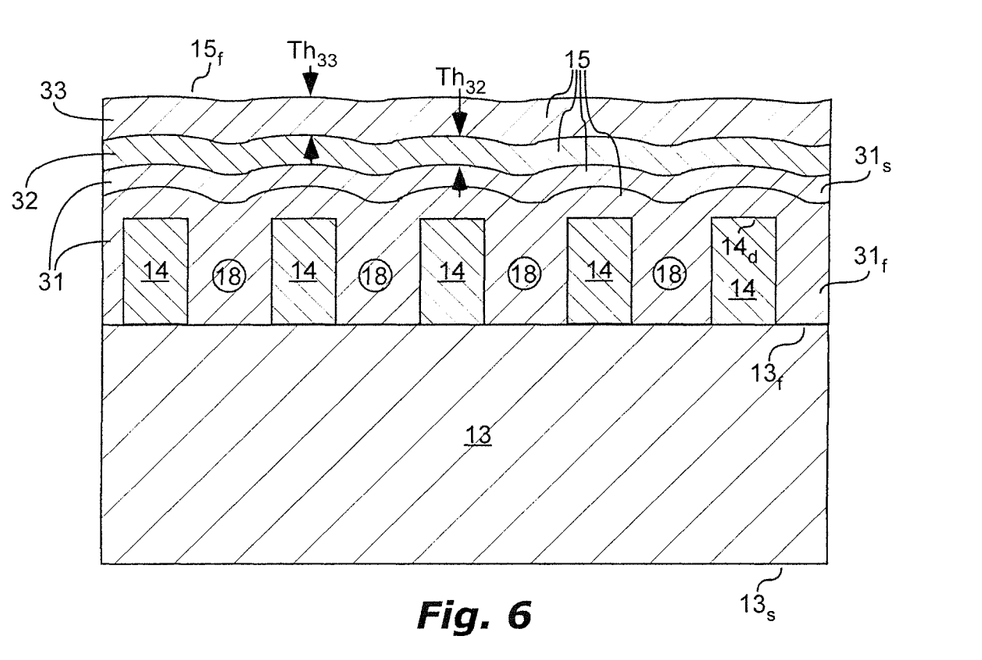
FIG. 6 is a schematic, cross-sectional side-view of a step in a method of making a polarizer, including applying an upper layer 33 over the middle layer 32, in accordance with an embodiment of the present invention.
Figure 7:
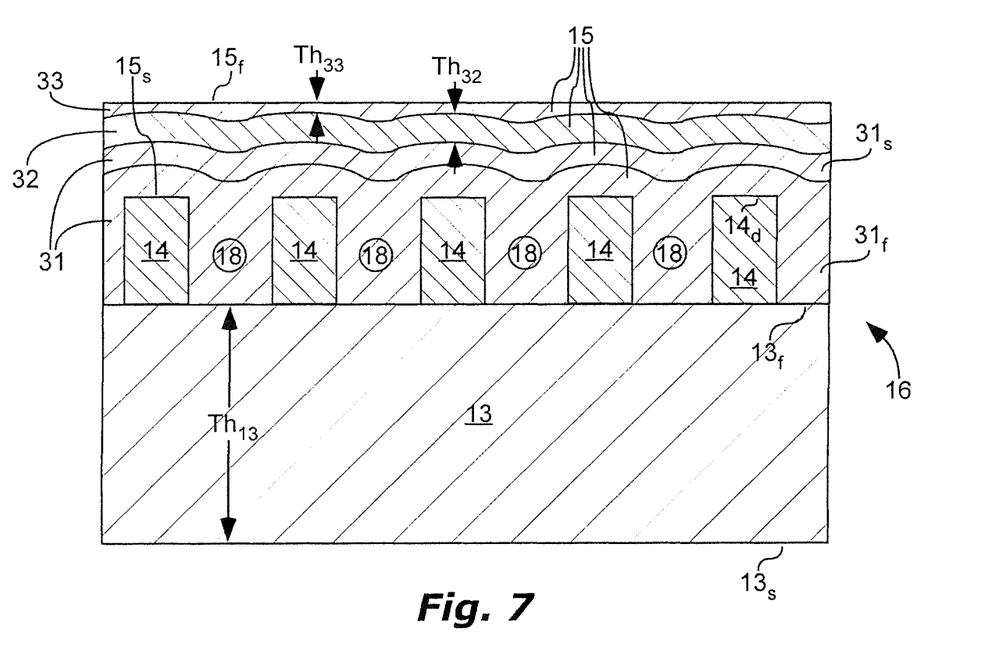
FIG. 7 is a schematic, cross-sectional side-view of a step in a method of making a polarizer, including polishing the solid first surface 15$_f$ of the upper layer 33, in accordance with an embodiment of the present invention.
Figure 8:
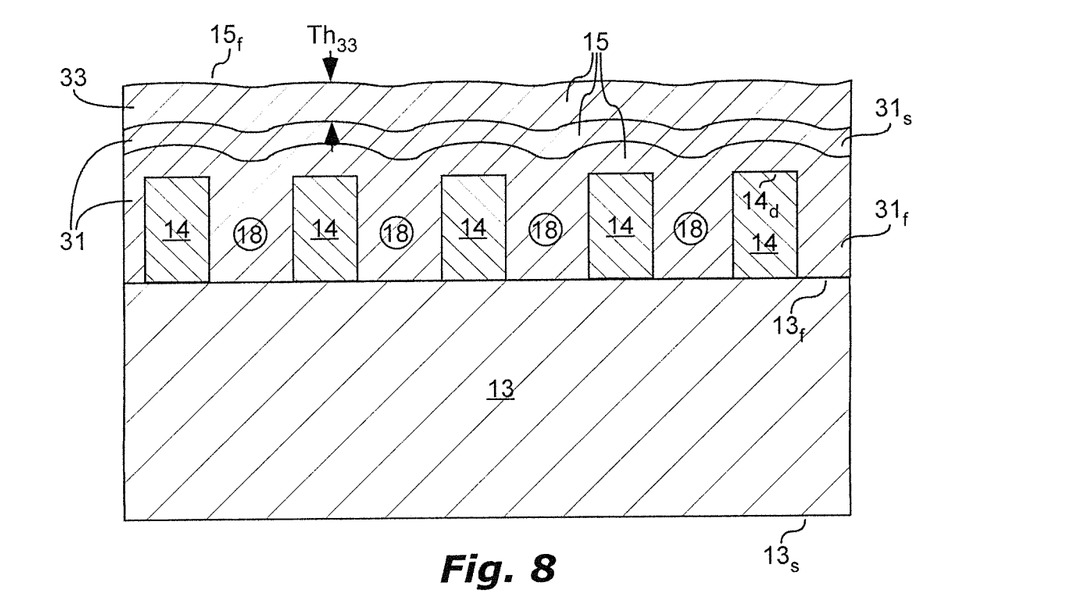
FIG. 8 is a schematic, cross-sectional side-view of a step in a method of making a polarizer, including applying an upper layer 33 over the lower layer 31, in accordance with an embodiment of the present invention.
Figure 9:
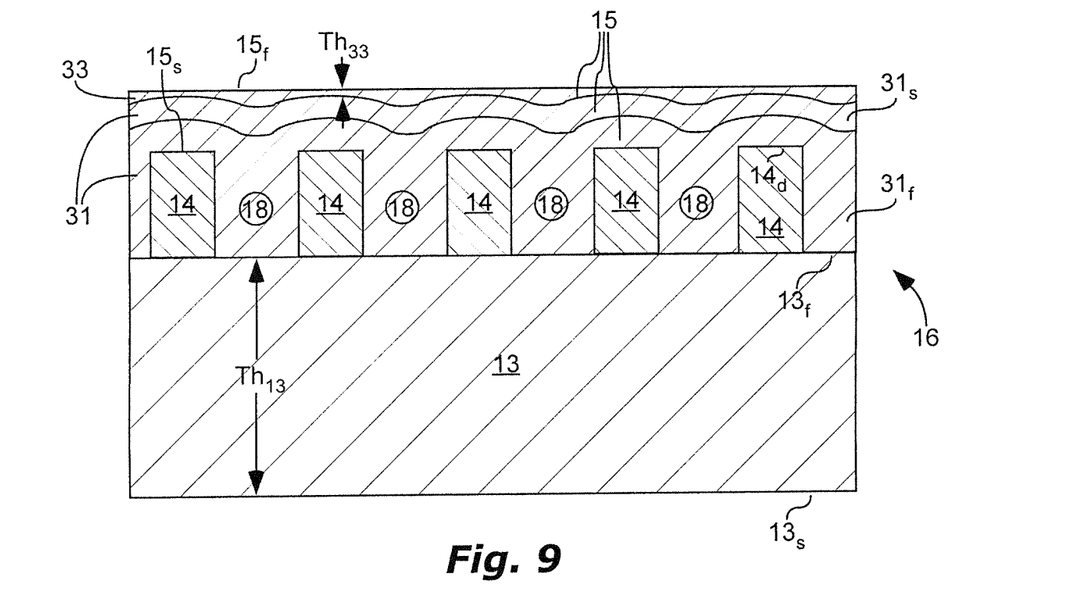
FIG. 9 is a schematic, cross-sectional side-view of a step in a method of making a polarizer, including polishing the solid first surface 15$_f$ of the upper layer 33, in accordance with an embodiment of the present invention.

Performance of the wire grid polarizing cube 10 and the embedded wire grid polarizer 20 can be improved by proper selection of layers of the thin film 15. The thin film 15 can include a lower layer 31, a middle layer 32, an upper layer 33, or combinations thereof. The lower layer 31 can fill the channels 18 and can extend over the distal end $14_d$ of the array of wires 14. The middle layer 32 can be located on the lower layer 31. The middle layer 32 can adjoin the lower layer 31. The upper layer 33 can be located on the middle layer 32 (FIGS. 6-7), or directly on the lower layer 31 if there is no middle layer 32 (FIGS. 8-9). The upper layer 33 can adjoin the lower layer 31 or the middle layer 32 on one side and can adjoin the first piece of glass 01 on an opposite side. There can be additional layers between the the array of wires 14 and the first piece of glass 01.

Optimal selection of materials for the thin film 15, with certain indices of refraction, can result in improved polarizer performance. For example, the middle layer 32 can have an index of refraction greater than an index of refraction of the lower layer 31, greater than an index of refraction of the upper layer 33, or both. Examples of values of the indices of refraction include ≤1.6, ≤1.7, or ≤1.8 for the lower layer 31, the upper layer 33, or both; and ≥2.0, ≥2.2, or ≥2.5 for the middle layer 32. Examples of a difference between the index of refraction of the middle layer 32 and the index of refraction of the lower layer 31, the index of refraction of the upper layer 33, or both, include ≥0.5, ≥0.7, and ≥1. Example materials include the lower layer 31, the upper layer 33, or both comprising silicon dioxide and the middle layer 32 comprising titanium dioxide. The upper layer 33 can have an index of refraction different than, or the same as, an index of refraction of the lower layer. The upper layer 33 can have a material composition different than, or the same as, a material composition of the lower layer 31.

The solid first surface $15_f$ of the upper layer 33 can be polished. This polished surface can adjoin the first piece of glass 01. A benefit of applying the upper layer 33 and polishing the upper layer 33 instead of polishing the middle layer 32 is that a thickness $Th_{32}$ of the middle layer 32 can be critical in some embodiments for proper performance of the wire grid polarizing cube 10 or the embedded wire grid polarizer 20. It may be possible to control a thickness $Th_{32}$ of the middle layer 32 within tight tolerances by sputtering, but difficult or impossible to control such thickness $Th_{32}$ within tight tolerances by applying extra material then polishing. In contrast, precise control of a thickness $Th_{33}$ of the upper layer 33 can be unimportant or of smaller importance. Thus, polishing a thickness $Th_{33}$ of the upper layer 32 can be done with minimal or no adverse effect on performance of the polarizer.

Method

A method of making a polarizer can comprise some or all of the following steps, which can be performed in the following order. Some of the steps can be performed in another order. There may be additional steps not described below. These additional steps may be before, between, or after those described. Components of the polarizer, and the polarizer itself, can have properties as described above.

FIRST STEP (FIGS. 3-6 & 8): Providing a wire grid polarizer 16 including: a substrate 13 having a first face $13_f$, and a second face 13, opposite of the first face $13_f$; an array of wires 14 on the first face $13_f$ of the substrate 13 with channels 18 between adjacent wires 14; and a thin film 15 at a distal end $14_d$ of the array of wires 14 farther from the substrate 13, the thin film 15 having a solid first surface $15_f$ farther from the array of wires 14 and a solid second surface 15, facing the array of wires 14 and the first face $13_f$ of the substrate 13.

The FIRST STEP can further comprise applying the thin film 15, including:

(A) Applying a lower layer 31 over a distal end $14_d$ of the array of wires 14 farther from the substrate 13. This step (A) can further comprise filling the channels 18 with the lower layer 31. This step (A) can also include filling the channels 18 with a first portion $31_f$ of the lower layer 31 of the thin film 15, then applying a second portion $31_s$ of the lower layer 31 over the first portion $31_f$ of the lower layer 31 and the distal end $14_d$ of the array of wires 14. The first portion $31_f$ can be applied by atomic layer deposition (ALD) and can fill the channels 18. ALD can more effectively fill the channels 18. The second portion $31_s$ can be applied by sputter deposition to reduce surface roughness of an exposed face of the lower layer 31. See FIGS. 3-4.

(B) Applying a middle layer 32 over the lower layer 31. The middle layer 32 can be applied by sputter deposition to reduce surface roughness of an exposed face of the middle layer 32. See FIG. 5.

(C) Applying an upper layer 33 over the middle layer 32 (FIG. 6) or over the lower layer 31 (FIG. 8). An example of a method of applying the upper layer 33 is sputter deposition. See FIG. 6.

SECOND STEP: Polishing the solid first surface $15_f$ of the upper layer 33. See FIG. 7 or 9.

THIRD STEP: Directly bonding the solid first surface $15_f$ of the thin film 15 to a solid surface $01_s$ of a first piece of glass 01. This THIRD STEP can further comprise applying hydroxide ions to the solid first surface $15_f$ of the thin film 15, to the solid surface $01_s$ of the first piece of glass 01, or both; then pressing the solid first surface $15_f$ of the thin film 15 to the solid surface $01_s$ of the first piece of glass 01. See FIGS. 1-2.

FOURTH STEP: Directly bonding the second face $13_s$ of the substrate 13 to a second piece of glass 02. See FIGS. 1-2.

Figure 10:
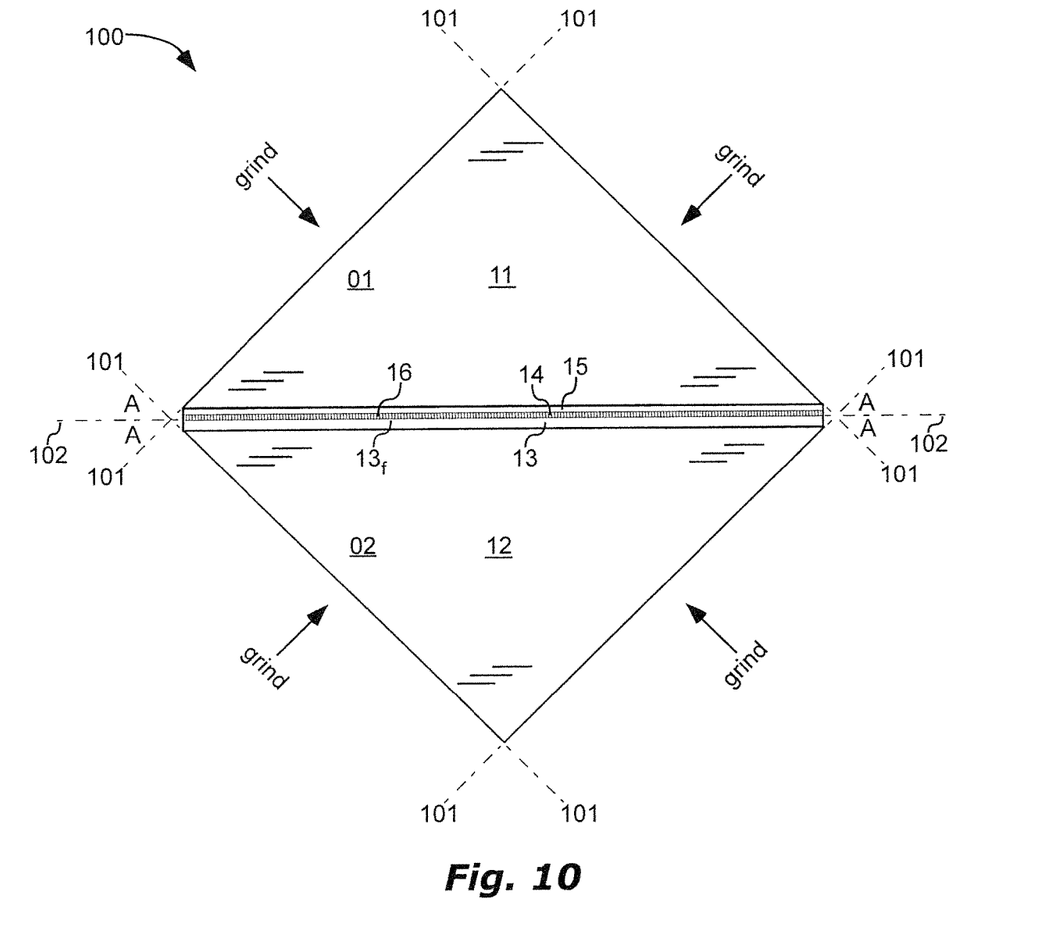
FIG. 10 is a schematic, cross-sectional side-view of a step in a method of making a wire grid polarizing cube 100, including grinding a first piece of glass 01 and a second piece of glass 02 at acute angles A with respect to a plane 102 parallel to the first face 13$_f$ of the substrate 13 to form a first prism 11 out of the first piece of glass 01 and a second prism 12 out of the second piece of glass 02, in accordance with an embodiment of the present invention.

FIFTH STEP: Grinding the first piece of glass 01 and the second piece of glass 02 at acute angles A with respect to a plane 102 parallel to the first face $13_f$ of the substrate 13 to form a first prism 11 out of the first piece of glass 01 and a second prism 12 out of the second piece of glass 02. The acute angles A are the angles between plane 101, parallel to a final outer face of a prism 11 or 12 of the wire grid polarizing cube 10, and plane 102. See FIG. 10. This step would be applicable if the first piece of glass 01 is a first sheet of glass 21 and the second piece of glass 02 is a second sheet of glass 22 as shown in FIG. 2 and a wire grid polarizing cube 10 as shown in FIG. 1 is desired. A decision of whether to bond prisms 11 and 12 to the wire grid polarizer 16, or to bond sheets of glass 21 and 22, then grind to form the wire grid polarizing cube 100, can be made based on manufacturability of each option.

The resulting wire grid polarizing cube 10 or embedded wire grid polarizer 20 from the above method can include properties as described above this METHOD section.

Figure 3:
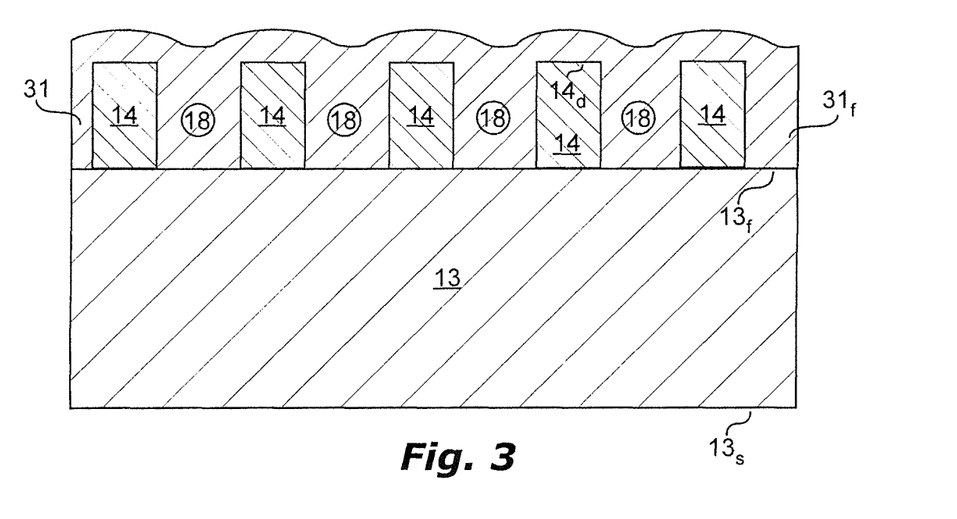
FIG. 3 is a schematic, cross-sectional side-view of a step in a method of making a polarizer, including filling channels 18 between adjacent wires 14 with a first portion 31$_f$ of a lower layer 31 of the thin film 15, in accordance with an embodiment of the present invention.
Figure 4:
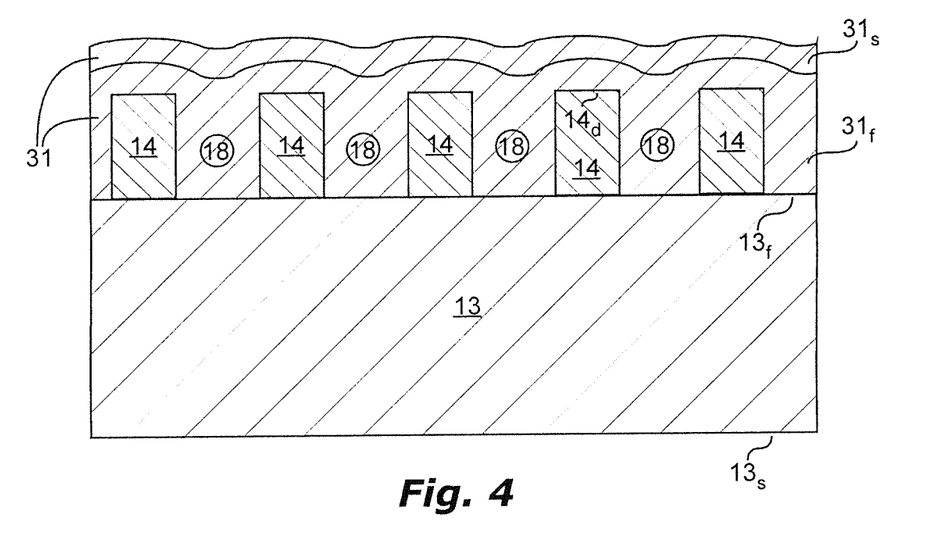
FIG. 4 is a schematic, cross-sectional side-view of a step in a method of making a polarizer, including applying a second portion 31$_s$ of the lower layer 31 over the first portion 31$_f$ of the lower layer 31 and over the array of wires 14, in accordance with an embodiment of the present invention.
Figure 5:
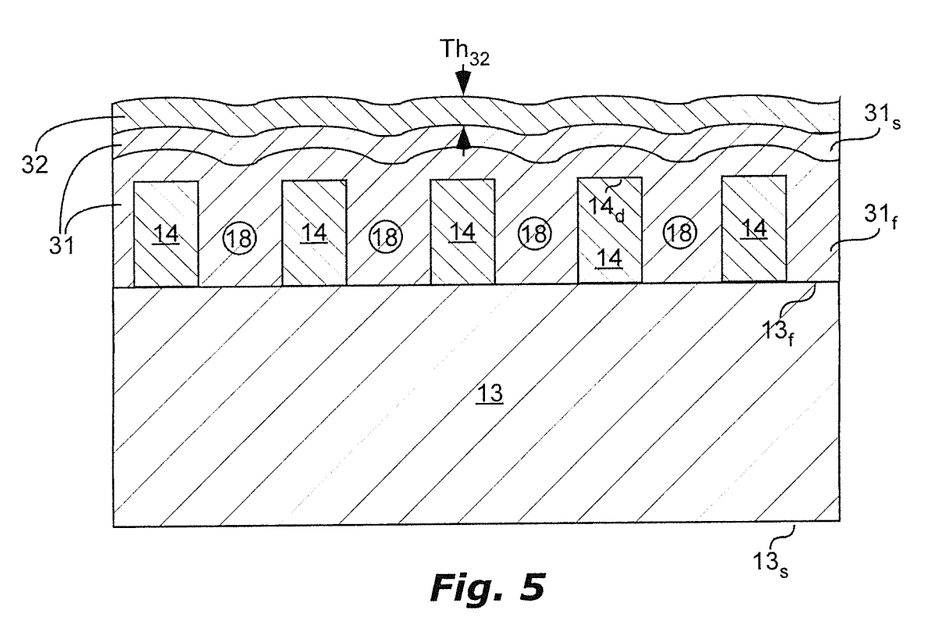
FIG. 5 is a schematic, cross-sectional side-view of a step in a method of making a wire grid polarizer, including applying a middle layer 32 over the lower layer 31, in accordance with an embodiment of the present invention.

Application of material of the lower layer 31 by ALD can effectively fill the channels 18, but can result in a wavy surface, as shown in FIG. 3. This wavy surface can prevent direct bonding of the first prism 11. Application of additional material of the lower layer 31, by sputtering, over the ALD deposited material can result in a smoother surface, but perhaps still too wavy for direct bonding of the first prism 11. Application of the middle layer 32 over the lower layer 31 can further smooth the surface. If thickness of the middle layer 32 is not critical, then this middle layer 32 could be polished. If thickness of the middle layer 32 is critical, or if a surface of the middle layer 32 is not sufficiently smooth, then application of an upper layer 33 that can be polished may be needed. An exposed face of the upper layer 33, the solid first surface $15_f$, can be smoother than the previously exposed surfaces of the lower layer 31 and the middle layer 32, but perhaps still too wavy for direct bonding to the first prism 11. The solid first surface $15_f$ of the upper layer 33 can be polished to form a sufficiently-smooth surface, then this solid first surface $15_f$, now polished, can be direct bonding to the first prism 11. The polarizer can be designed such that thickness $Th_{33}$ of the upper layer 33 is not critical, thus allowing polishing of the upper layer 33. For example, if the upper layer 33 is made of the same material as the first piece of glass 01, then tight control of the thickness $Th_{33}$ of the upper layer 33 is likely not important.

What is claimed is:

1. A method of making a polarizer, the method comprising:
   providing a wire grid polarizer including a substrate having a first face, and a second face opposite of the first face and an array of wires on the first face of the substrate with channels between adjacent wires;
   applying a thin film, including:
      applying a lower layer over a distal end of the array of wires farther from the substrate;
      applying a middle layer over the lower layer, the middle layer having an index of refraction greater than an index of refraction of the lower layer;
      applying an upper layer over the middle layer, the upper layer having an index of refraction less than an index of refraction of the middle layer;
      the thin film having a solid first surface farther from the array of wires, being an outer surface of the upper layer, and a solid second surface facing the array of wires and the first face of the substrate;
   polishing the solid first surface of the thin film; and
   directly bonding the solid first surface of the thin film to a solid surface of a first piece of glass.

2. The method of claim 1, wherein applying the lower layer over the distal end of the array of wires further comprises: filling the channels with a first portion of the lower layer by atomic layer deposition then applying a second portion of the lower layer over the first portion and over the distal end of the array of wires by sputter deposition.

3. The method of claim 2, wherein applying the middle layer includes applying the middle layer by sputter deposition and applying the upper layer includes applying the upper layer by sputter deposition.

4. The method of claim 1, wherein a material composition of the lower layer equals a material composition of the upper layer.

5. The method of claim 1, wherein, the index of refraction of the lower layer is ≥1.7; the index of refraction of the middle layer is ≤2.0; and the index of refraction of the upper layer is ≥1.7.

6. The method of claim 1, wherein:
  a difference between the index of refraction of the lower layer and the index of refraction of the middle layer is ≤0.7; and
  a difference between the index of refraction of the upper layer and the index of refraction of the middle layer is ≤0.7.

7. The method of claim 1, wherein the lower layer comprises silicon dioxide, the middle layer comprises titanium dioxide, and the upper layer comprises silicon dioxide.

8. The method of claim 1, further comprising:
  directly bonding the second face of the substrate to a second piece of glass;
  grinding the first piece of glass and the second piece of glass at acute angles with respect to a plane parallel to the first face of the substrate to form a first prism out of the first piece of glass and a second prism out of the second piece of glass.

9. The method of claim 1, wherein the solid first surface is ≤99.8% inorganic.

10. The method of claim 1, wherein the thin film has a thickness of ≥1000 nm between the distal end of the array of wires and the solid first surface.

11. The method of claim 1, wherein directly bonding the solid first surface of the thin film to the solid surface of the first piece of glass includes:
  applying hydroxide ions to the solid first surface of the thin film, to the solid surface of the first piece of glass, or both; then
  pressing the solid first surface of the thin film to the solid surface of the first piece of glass.

12. A method of making a polarizer, the method comprising:
  providing a wire grid polarizer including a substrate having a first face, and a second face opposite of the first face; and an array of wires on the first face of the substrate with channels between adjacent wires;
  applying a thin film at a distal end of the array of wires farther from the substrate, the thin film having a solid first surface farther from the array of wires and a solid second surface facing the array of wires and the first face of the substrate, and applying the thin film includes: filling the channels with a lower layer and applying the lower layer over a distal end of the array of wires farther from the substrate; applying a middle layer over the lower layer, the middle layer having an index of refraction greater than an index of refraction of the lower layer; and applying an upper layer over the middle layer, the upper layer having an index of refraction less than an index of refraction of the middle layer; and
  directly bonding the solid first surface of the thin film to a solid surface of a first piece of glass.

13. The method of claim 12, wherein filling the channels with the lower layer and applying the lower layer over the distal end of the array of wires further comprises: filling the channels with a first portion of the lower layer by atomic layer deposition then applying a second portion of the lower layer over the first portion and the distal end of the array of wires by sputter deposition.

14. The method of claim 13, wherein applying the middle layer includes applying the middle layer by sputter deposition and applying the upper layer includes applying the upper layer by sputter deposition.

15. The method of claim 13, further comprising, between the step of providing the wire grid polarizer and the step of directly bonding:
  polishing the solid first surface.

16. The method of claim 12, wherein the polarizer is capable of withstanding a temperature of 300° C. for 10 hours with 1% reduction in transmission of a primarily transmitted polarization and 0.1% increase in transmission of an opposite polarization.

17. The method of claim 12, wherein a difference between an index of refraction of the solid first surface and an index of refraction of the first piece of glass is 0.1.

18. The method of claim 12, wherein:
  the thin film has a thickness of ≥1000 nm between the distal end of the array of wires and the solid first surface; and
  a distance between the distal end of the array of wires and the first piece of glass is filled solely by the thin film.

19. The method of claim 18, wherein the thin film has a thickness of ≥300 nm between the distal end of the array of wires and the solid first surface.

20. The method of claim 18, wherein the thin film is ≤99.8% inorganic.

* * * * *